United States Patent

Marano, Jr.

[11] 4,000,357
[45] Dec. 28, 1976

[54] POLYMERIZATION OF ETHYLENE WITH OXYGEN AND ORGANIC INITIATORS

[75] Inventor: John P. Marano, Jr., Charleston, W. Va.

[73] Assignee: Union Carbide Corporation, New York, N.Y.

[22] Filed: Aug. 29, 1974

[21] Appl. No.: 501,701

[52] U.S. Cl. .............................. 526/228; 526/230; 526/235; 526/352

[51] Int. Cl.² ..................... C08F 4/38; C08F 4/32; C08F 4/28

[58] Field of Search .............. 260/94.9 R; 450/709, 450/713.5; 526/228, 230, 235

[56] References Cited

UNITED STATES PATENTS

| | | | |
|---|---|---|---|
| 3,092,614 | 6/1963 | Erdmann et al. | 260/94.9 R |
| 3,142,666 | 7/1964 | Deex et al. | 260/94.9 R |
| 3,293,233 | 12/1966 | Erchak et al. | 260/94.9 R |
| 3,691,145 | 9/1972 | Gierth et al. | 260/94.9 R |

FOREIGN PATENTS OR APPLICATIONS 70,018  12/1959  India ........................ 260/94.9 R

*Primary Examiner*—Joseph L. Schofer
*Assistant Examiner*—Maria S. Tungol
*Attorney, Agent, or Firm*—James J. O'Connell

[57] ABSTRACT

Ethylene is polymerized alone, or with other comonomers, under high pressure with oxygen and two or more organic initiators in a tubular reactor for the purposes of increasing the conversion of monomer to polymer and to produce polymer which has a low hexane extractables content, and which has, in the form of film, improved optical properties.

5 Claims, No Drawings

POLYMERIZATION OF ETHYLENE WITH OXYGEN AND ORGANIC INITIATORS

BACKGROUND OF THE INVENTION

1. Field of the Invention

The invention relates to the high pressure polymerization of ethylene wiht free radical catalysts.

2. Description of the Prior Art

It is known to polymerize ethylene, alone or with other comonomers, under high pressure conditions in an elongated tubular reactor for the purposes of producing polymers of ethylene having both a relatively narrow density range of about 0.850 to 0.940 and a relatively narrow melt index range of about 0.05 to 10,000. Such properties are needed for film and other grade resins. It is also known that free radical initiators or catalysts, such as oxygen, azo compounds and organic peroxides, may be used to catalyze the polymerization of the monomer charge under such polymerization conditions to produce such polymers. In order to help regulate the molecular weight, or melt index, of the ethylene polymers, it is also common to employ chain transfer agents in the high pressure polymerization reaction system. The percent conversions which are obtained with such catalysts under such conditions, however, are usually relatively low, i.e., of the order of only about 10 to 20 percent.

%Conversion means, in this context, $$\frac{\text{Pounds of Polymer Produced/Unit Time}}{\text{Pounds of Ethylene Fed/Unit Time}} \times 100$$

In order to attempt to improve the percent conversion of monomer to polymer during the passage of the monomer through the reaction tube it has been known to use a plurality of free radical initiators. Although the percent conversion of monomer to polymer may be thereby improved, it has been found, however, that because of the use of the plurality of initiators, in combination with the chain transfer agents, in such reactors, it has not been readily possible to provide for an increased percent conversion of monomer to film grade polymer without also suffering a concomitant loss in the optical properties of film made from the resin having specified melt index and density properties.

In addition to losses in optical properties, such as gloss and clarity, polymer made in some cases with a plurality of initiators also tends to have an undesirable, high hexane extractable fraction i.e. a low molecular weight fraction.

SUMMARY OF THE INVENTION

It has now been found that ethylene may be polymerized alone, or with other comonomers, in the presence of a chain transfer agent and at a level of conversion of as high as about 27 percent, under high pressure conditions and in a tubular reactor, so as to produce film grade resin having a relatively low molecular weight fraction and improved optical properties if the monomer charge is polymerized under a specific set of reaction conditions as noted below, with, as a free radical catalyst, oxygen in combination with two or more organic initiators having specified 10 hour half life temperature ranges.

An object of the present invention is to provide a process whereby ethylene may be polymerized alone, or with other comonomers, in an elongated tubular reactor under high pressure conditions so as to achieve high conversions of monomer to film grade polymer having improved optical properties and a low hexane extractable fraction.

A further object is to provide resins having improved utility in insulation compositions for electrical wire and cable by virtue of providing improved electrical properties and stress-crack resistance to such insulation made with such resins.

DESCRIPTION OF THE PREFERRED EMBODIMENT

It has now been found that the objects of the present invention can be readily achieved when ethylene is polymerized alone, or with other comonomers, in the presence of chain transfer agents, and in a tubular reactor as further described below, if the polymerization reaction is catalyzed by the use of a combination of at least three free radical initiators, at least one of which being molecular oxygen, a second of which is at least one organic initiator having a 10 hour half life temperature below 123° C and preferably below 79° C and a third of which is at least one organic initiator having a 10 hour half life temperature above 133° C. and preferably above 160° C.

A "10 hour half life temperature" means the temperature at which half of the initiator initially present will be present after 10 hours in dilute benzene solutions.

The Free Radical Catalysts

As noted above the initiators or catalysts which are used in the process of the present invention comprise oxygen and at least two organic compound initiators. These organic initiators include peroxides, hydroperoxides, azo compounds, amine oxide compounds hydrazine or hydrazinium compounds, perester compounds and organic hyponitrites. The peroxides include dialkyl peroxides, peroxy acids, diacyl peroxides ánd cyclic peroxides. At least one of such organic initiators is to have a 10 hour half life temperature below 123° C and preferably below 79° C and at least one other of such organic initiators has a 10 hour half life temperature above 133° C., and preferably above 160° C.

No organic initiator is used in the process of the present invention which has a 10 hour half life in the range of 123 to 133° C.

The organic initiators which have a 10 hour half life (in benzene as a solvent) of below 123° C., referred to hereinafter as the I organic initiators, and which may be used in the process of the present invention include, with their 10 hour half life temperatures, tertiary-butyl peroxy-2-ethyl hexanoate, 72°C.; propionyl peroxide, 64° C., azobisisobutyronitrile, 64° C., t-butyl perisobutyrate, 79° C. and t-butyl peroxypivalate, 55° C. The I initiators may be used individually or in combination with one another.

The organic initiators which may be used in the process of the present invention and which have a 10 hour half life (in benzene as a solvent) of above 133° C., referred to hereinafter as the II organic initiators, would include, with their 10 hour half life temperatures, tertiary-butyl hydroperoxide, 172° C.; bis(t-butyl peroxy)-dimethyl silane, 167° C., (t-butylperoxy)-trimethyl silane, 180° C., and cumene hydroperoxide, 158° C. The II organic initiators may be used individually or in combination with one another.

The organic initiators are added to the polymerization reaction system, as described below., in the form of solutions in organic solvents which are inert or compatible to these initiators, the oxygen, the monomers, the chain transfer agents and any other adjuvants which are employed in the process of the present invention.

The organic initiators and the oxygen are usually added to the reaction system together. The organic initiators may be added in the form of a solution thereof in an inert organic solvent or compatible chain-transfer agent at a concentration in such solutions of about 5 to 100, and preferably of about 10 to 20 weight percent. The organic initiators may be added in the same or different solutions thereof. Such organic solvents would include hexane, isopropanol, mineral spirits (petroleum solvent having a boiling point in the range of about 130° to 250° C.) and mineral oil (mixture of liguid hydrocarbons obtained from petroleum).

CHAIN TRANSFER AGENT

The chain transfer agents which may be employed in the process of the present invention are chemicals which are inert to the organic initiators, the oxygen, the monomers and any other adjuvants which are employed in the process of the present invention.

The chain transfer agents are usually added to the reaction system as is. They can also be added, in some cases, in the form of a solution thereof.

The chain transfer agents which may be used in the process of the present invention would include all those known to cause chain transfer in ethylene polymers produced by free radical catalysis, such as hydrogen, propylene, saturated $C_1$ to $C_{20}$, or more, aliphatic hydrocarbons and halogen substituted hydrocarbons such as methane, ethane, propane, butane isobutane, n-hexane, n-heptane, cycloparafins, chloroform and carbon tetrachloride; saturated $C_1$ to $C_{20}$, or more, aliphatic alcohols such as methanol, ethanol, propanol and isopropanol; saturated $C_1$ to $C_{20}$, or more, aliphatic carbonyl compounds such as carbon dioxide, acetone and methyl ethyl ketone; saturated $C_2$ to $C_{20}$, or more, aliphatic ethers and esters such s methyl ether and ethyl ether; and saturated aliphatic aldehydes such as formaldehyde and aromatic compounds such as toluene, diethylbenzene and xylene. Chain transfer compounds common to ethylene polymerization are disclosed in Mortimer, *J. Poly. Sci. Al*, 4, 881 (1966).

The comonomers which are employed with the ethylene also function, to some extent, as chain transfer agents.

The chain transfer agents may be used individually, or in combination with one another.

ADJUVANTS

Other adjuvants or additives which may be added to the stream of monomer which is being polymerized would incline antioxidants, and inhibitors added to control polymer growth and polymer branching.

THE POLYMERS

The polymers which are prepared in the process of the present invention are homopolymers of ethylene, or interpolymers of ethylene and one or more monomers which can be interpolymerized with ethylene with free radical initiators at pressures of >15,000 psi. Up to about 50, and preferably 0.5 to 50, weight percent of the monomers are interpolymerized with the ethylene.

The comonomers would include those containing one or more polymerizable carbon-to-carbon double bonds. Such comonomers would include propylene, vinyl acetate, acrylic acid and ethyl acrylate.

The polymers made by the process of the present invention have the following properties:

density of 0.8 to 1.0 grams per cubic centimeter, and preferably of 0.8 to 1.0 grams per cubic centimeter (as measured by ASTM D-1505-57T)

melt index (MI) of 0.05 to 10,000 decigrams per minute, (as measured by ASTM D-1238 measured at 44 psi and 190° C for MI <100). For melt index of ≥ 100 use a 325 gm weight.

hexane extractables of <5.3 weight %, and preferably of <2.5 weight % (as determined by extracting a polymer film (1.5 mil) with boiling hexane at 50 ± 1° C. at atmospheric pressure for 2 hours)

haze of 2 to 23%, (as determined by ASTM D-1003-52)

gloss of 65 to 160%, (as determined by the 60° specular gloss by means of the Gardner 60° Specular Glossmeter and Automatic Photometric Unit - viewing and illuminating beams specified by ASTM Method D-523-53 T).

The physical property data for % gloss and haze, are measured on samples of film made from the polymer being evaluated. The film is in the form of 1.5 mil sheets which are formed by extruding the polymer.

THE POLYMERIZATION PROCESS

The polymerization process of the present invention is conducted in an elongated tubular reactor having a diameter of about ⅛ to 4.0 inches, and preferably ⅞ to 2 ½ inches, and a length to diameter ratio of >1000 and preferably of about 1000 to 3000. The reaction is conducted under a pressure of >15,000 psi and preferably of about 30,000 to 50,000 psi. The pressure is provided by the feed of pressurized monomer.

The pressurized monomer may be fed into one end, the inlet end, of the tubular reactor or it may also be fed into the reactor downstream from the inlet end, as one or more sidestreams and is polymerized in the reactor. The polymer is blown out or carried out of the other end, the exhaust end of the reactor, by the flow of unreacted monomer. The polymer is separated from the unreacted monomer and the unreacted monomer is recovered, recompressed to the desired pressure level, and recycled to the inlet end or the side entry ports of the reactor. The monomer is passed through the reactor at a velocity of 8 to 100 ft/sec and preferably of 20 to 40 ft/sec and at a volume of 80 to 400,000, and preferably of 20,000 to 200,000 pounds per hour of monomer. The velocity of the monomer(s) employed provides for a contact time of the monomer within the reactor of about 0.1 to 300 seconds, and preferably of about 35 to 60 seconds.

The initiators and/or chain transfer agents may be admixed with the monomer before the monomer is fed into the reactor, or the initiators and/or the chain transfer agents, alone, may be fed into the reactor, downstream of the point or points at which the monomer is fed to the reactor.

The concentration of each of the initiators and of the chain transfer agent, which is employed is as follows

| Additive | Concentration of Additive |
|---|---|
| Initiator I | 0.1 to 10 mole ppm |
| Oxygen | 0.1 to 100 mole ppm |
| Initiator II | 0.1 to 10 mole ppm |

| Additive | Concentration of Additive |
|---|---|
| Chain transfer agent | 0 to 5.0 mole % |
| Initiator and/or Antioxidant | 0 to 2000 wt ppm |

|  | IT, °C. | PT, °C. |
|---|---|---|
| I organic initiator | 100 to 150 | 150 to 300 |
| O$_2$ | 170 to 200 | 200 to 400 |
| II organic initiator | 180 to 300 | 300 to 400 |

Before being introduced into the reactor, or admixed with the initiators and the chain transfer agent, the pressurized monomer is preheated to a temperature of about 100° to 200° C.. The monomer and all the other components of the reaction system may also be preheated to a temperature of about 100° to 200° C. in a preheat zone of the reactor. This preheat zone is located at the inlet end of the reactor tube and is long enough to heat the monomer to the desired initiation temperature. This preheating is designed to raise the temperature of the reaction system to the initiation temperature of the I organic initiator.

As noted above, when the initiators are added to the monomer, they are usually all added together, i.e., at one time, or the oxygen may be added separately, either just before or just after the addition of the solution. of the organic initiators. The oxygen is usually added in the form of air at a pressure of about 1000 to 5000 psi.

The three types of initiators I, O$_2$, and II) may be added either at the inlet end of the reactor, or downstream of the inlet end of the reactor, at one or more side entry ports. The initiators are used to sequentially initiate the polymerization of a portion of the monomer at different temperatures within the reactor, and downstream from the preheat zone, if any. Each of the three types of initiators has an initiation temperature (IT) and a higher peak temperature (PT). The initiation temperature is the temperature at which the initiator begins to initiate the polymerization of the monomers. Since the reacion is exothermic, the temperature of the system will rise to a peak temperature which is the maximum temperature which can be achieved under the prevailing reaction conditions with the initiator in question. The I initiators have a lower initiation temperature and a lower peak temperature than oxygen, and oxygen, in turn, has a lower initiation temperature and a lower peak temperature then the II initiators. The peak temperature of the I initiator approximates the initiation temperature of oxygen, and the peak temperature of oxygen approximates the initiation temperature of the II initiators. The exotherm created by the use of the I peroxide is thus used to heat up the contents of the reactor, which then includes unused chain transfer agent, initiator II, oxygen, the polymer formed with the I initiator and the remaining monomer, to the initiation temperature of the oxygen without the need for any external heat for this purpose. Similarly the exotherm created by the use of the oxygen as an initiator is then used to heat up the contents of the reactor, which then includes initiator II, polymer formed from initiator I and the oxygen and the remaining chain transfer agent and monomer, to the initiation temperature of initiator II, without the need for any external heat for this purpose.

The three types of initiators thus each have ranges of initiation temperatures and peak temperatures depending on the other process conditions such as pressure, comonomer, reactor length, jacket fluid temperature, and residence time as follows Although each of the three types of initiators employed has a separate peak temperature, it is only the highest of such peak temperatures, i.e. that of organic initiator II, which is usually recorded as the peak temperature of the particular combination of the three types of initiators that is employed.

After the peak temperature of the II type of organic initiator is reached the reaction system is cooled to about 230° to 260° C., before allowing the flow of polymer and unreacted monomer to be exhausted from the exhaust end of the reaction tube, or to 150° to 230° C. before injecting a second, or any additional charge of the initiators into the reactor tube, or quenched with cool ethylene to 100° to 150° C. before allowing any additional charge of initiator.

The cooling zones in the reactor are usually about 200 to 8000 feet long. It has been found that, in order to obtain the optimum benefits of the use of the combination of initiators of the present invention, relative to achieving the desired objects of the present invention, the length of the reactor tube between the point in the tube at which the initiation temperature of the I organic initiator is reached and the point in the tube at which the peak temperature of the II organic initiator is reached should be such that the overall length (L), in feet, of the reactor tube must be as determined by the equation:

$$L \geq 1.3825 \left( \frac{W^2}{D} \right)^{1/3}$$

wherein
W = monomer pumping rate (pounds/hour)
D = reactor tube inner diameter (inches).

The following examples are merely illustrative of the present invention and are not intended as a limitation upon the scope thereof.

EXAMPLES 1–4

A series of four experiments were conducted to demonstrate the present invention. In each experiment ethylene was homopolymerized in a tubular reactor which had an internal diameter of ⅞ to 1 inch and a length to diameter ratio of >1000. The reactor was jacketed and cooled with water and Dowtherm heat exchange medium. The pumping rate of the monomer was between 15,800 and 16,500 pounds per hour.

The initiators, and the amounts thereof, and the rate of feed of monomer used in each experiment, were the following

TABLE I

| Example | C$_2$H$_4$ Feed, lbs/hr. | Initiators (molar parts per million in C$_2$H$_4$ Feed) | | | |
|---|---|---|---|---|---|
| | | TBH | DTBP | TBPO | O$_2$ |
| 1 | 16500 | 2.5 | 5.6 | 2.55 | None |
| 2 | 16500 | 3.02 | None | 2.4 | 9.1 |
| 3 | 15800 | 3.12 | 2.33 | 2.8 | None |

TABLE I-continued

| Example | C₂H₄ Feed, lbs/hr | Initiators (molar parts per million in C₂H₄ Feed) | | | |
|---|---|---|---|---|---|
| | | TBH | DTBP | TBPO | O₂ |
| 4 | 16600 | 2.8 | None | 2.4 | 9.6 |

TBH is tertiary butyl hydroperoxide.
DTBP is ditertiary butyl peroxide.
TBPO is tertiary butyl peroxy-2-ethyl hexanoate.

In addition to the initiators, the ethylene feed of each example contained the following amounts of chain transfer agents in mol %.

TABLE II

| Example | Propylene | Isopropanol |
|---|---|---|
| 1 | 0.78 | 1.69 |
| 2 | 0.40 | 1.88 |
| 3 | 0.6 | 1.67 |
| 4 | 0.45 | 1.67 |

The polymers produced in each experiment had the following properties, and were produced at the indicated % conversions:

TABLE III

| Example | Melt Index decigrams/minute | Density grams/cc | Haze | Gloss, % | Hexane extractables | Conversion, % |
|---|---|---|---|---|---|---|
| 1 | 6.9 | 0.9215 | 6.5 | 142 | 4.78 | 23.8 |
| 2 | 6.3 | 0.9215 | 5.4 | 143 | 5.16 | 25.0 |
| 3 | 4.72 | 0.9213 | 5.9 | 131 | 5.52 | 25.55 |
| 4 | 4.42 | 0.9206 | 6.9 | 139 | 5.07 | 26.0 |

Examples 1 and 3 are comparative examples. In conjunction with Examples 2 and 4, which were conducted in accordance with the process of the present invention they demonstrate that the specific combinations of initiators of the present invention provide improved optical properties in the polymer products with no loss in conversion, or that, at the same level of properties, improved conversions can be obtained. Thus Examples 1 and 2 show that at about the same level of gloss and other resin properties the initiator system of Example 2 provides about a 1.2% increase in the level of conversion, Examples 3 and 4 show that at approximately the same level of other resin properties, the initiator system of Example 4 provides a 9% increase in the level of gloss, with an increase of about 0.45% in the level of conversion. These increases in conversion, although numerically small, are substantial in terms of the technology involved and the commercial significance thereof.

Other process parameters involved in Examples 1-4 are the following:

| Example | Pressure C₂H₄ Feed psi | Peak Temp., °C. | location* of peak temp., % of tube |
|---|---|---|---|
| 1 | 37300 | 339 | 63 |
| 2 | 37250 | 330 | 58 |
| 3 | 37130 | 345 | 62 |
| 4 | 37180 | 340 | 63 |

*The location is at a position in the tubular reactor which is at the given percent of the overall length of the reactor, as measured from the inlet end thereof.

In the experiment of Examples 1-4 the monomer, as fed to the inlet end of the reactor tube, contained all the initiators and chain transfer agents.

Ditertiary butyl peroxide, which was used in comparative examples 1 and 3 in place of oxygen, has a 10 hour half life temeperature, in benzene, of 125°C.

What is claimed is:

1. In a process for producing film grade polymer of ethylene having improved optical properties and a low hexane extractables fraction in a tubular reactor under high pressure conditions in the presence of chain transfer agent and a plurality of free radical initiators, the improvement which comprises conducting said process in a reactor having a length to diameter ratio of >1000, and wherein the length of the tubular reactor, in feet, between the point in the tubular reactor at which the initiation temperature of a first organic free radical initiator is reached and the point in the tubular reactor at which the peak temperature of a second organic free radical initiator is reached is $$\geq 1.3825 \left( \frac{W^2}{D} \right)^{1/3}$$

wherein $W$ = the monomer pumping rate, in pounds per hour, and $D$ = the inner diameter of the reactor tube, in inches, and in the presence of, as said initiators, molecular oxygen, at least one said first organic free radical initiator having a 10 hour half life temperature of <123° C. and at least one said second organic free radical initiator having a 10 hour half life temperature of >133° C.

2. A process as in claim 1 for producing ethylene homopolymer.

3. A process as in claim 2 in which said first organic initiator has a 10 hour half life temperature of <79° C. and said second organic initiator has a ten hour half life temperature of <160° C.

4. A process as in claim 3 in which said first organic initiator comprises tertiary-butyl-peroxy-2-ethyl hexanoate.

5. A process as in claim 4 in which said second organic initiator comprises tertiary-butyl hydroperoxide.

* * * * *

UNITED STATES PATENT OFFICE
CERTIFICATE OF CORRECTION

Patent No. 4,000,357          Dated December 28, 1976

Inventor(s) John P. Marano Jr.

It is certified that error appears in the above-identified patent and that said Letters Patent are hereby corrected as shown below:

Column 3, line 33, "," should be inserted before "isobutane".

Column 3, line 40, "s" should read --as--.

Column 3, line 56, "incline" should read --include--.

Column 5, line 27, "(" should be inserted before "I".

Column 5, line 38, "reacion" should read --reaction--.

Column 8, line 17, "temeperature" should read --temperature--.

Column 8, line 61, "$<160°$" should read --$>160°$--.

Signed and Sealed this

Eighth Day of March 1977

[SEAL]

Attest:

RUTH C. MASON  
Attesting Officer

C. MARSHALL DANN  
Commissioner of Patents and Trademarks